(12) United States Patent
Samet

(10) Patent No.: US 10,752,802 B2
(45) Date of Patent: *Aug. 25, 2020

(54) BIO-DEGRADABLE COMPOSITIONS AND USE THEREOF

(71) Applicant: BIO PLASMAR LTD., Ha'Ela (IL)

(72) Inventor: Chanoch Samet, Ha'Ela (IL)

(73) Assignee: BIOPLASMAR LTD., Ha'ela (IL)

( * ) Notice: Subject to any disclaimer, the term of this patent is extended or adjusted under 35 U.S.C. 154(b) by 3 days.

This patent is subject to a terminal disclaimer.

(21) Appl. No.: 15/959,633

(22) Filed: Apr. 23, 2018

(65) Prior Publication Data

US 2018/0237655 A1    Aug. 23, 2018

Related U.S. Application Data (63) Continuation of application No. 15/090,011, filed on Apr. 4, 2016, now Pat. No. 9,951,248, which is a
(Continued)

(51) Int. Cl.
| | | |
|---|---|---|
| C09D 167/04 | (2006.01) | |
| C08J 3/09 | (2006.01) | |
| A01G 9/029 | (2018.01) | |
| A01G 9/02 | (2018.01) | |
| A47G 19/03 | (2006.01) | |
| C09D 5/00 | (2006.01) | |
| C09J 9/00 | (2006.01) | |
| C09J 11/06 | (2006.01) | |
| C08K 5/02 | (2006.01) | |

(Continued)

(52) U.S. Cl.
CPC ............ *C09D 167/04* (2013.01); *A01G 9/02* (2013.01); *A01G 9/021* (2013.01); *A01G 9/0291* (2018.02); *A47G 19/03* (2013.01); *C08J 3/091* (2013.01); *C09D 5/00* (2013.01); *C09J 9/00* (2013.01); *C09J 11/06* (2013.01); *C08J 2300/16* (2013.01); *C08J 2367/04* (2013.01); *C08K 5/02* (2013.01); *C08K 5/07* (2013.01); *C08K 5/101* (2013.01)

(58) Field of Classification Search
CPC ................................. A01G 9/00; A01G 24/30
See application file for complete search history.

(56) References Cited

U.S. PATENT DOCUMENTS

| | | | |
|---|---|---|---|
| 3,644,167 | A | 2/1972 | Mowry |
| 3,914,900 | A | 10/1975 | Bigelow |

(Continued)

FOREIGN PATENT DOCUMENTS

| | | | |
|---|---|---|---|
| JP | 04146952 A | 5/1992 | |
| JP | 04334448 A | 11/1992 | |

(Continued)

OTHER PUBLICATIONS

Machine Translation of JP 2003-238931, 2019 (Year: 2019).*

(Continued)

*Primary Examiner* — Liam J Heincer
(74) *Attorney, Agent, or Firm* — Roach, Brown, McCarthy & Gruber, P.C.; Kevin D. McCarthy (57) ABSTRACT

A bio-degradable plant pot having calcium carbonate. And a method for preparing a rooting plug. The method calls for mixing a composition having (i) 0.2%-10% w/w bio-degradable polymer and (ii) an organic non-hydroxylic solvent with plug mix, thereby preparing a rooting plug.

15 Claims, 4 Drawing Sheets

Related U.S. Application Data continuation of application No. 14/344,643, filed as application No. PCT/IL2011/000739 on Sep. 18, 2011, now abandoned.

(51) Int. Cl.
*C08K 5/07* (2006.01)
*C08K 5/101* (2006.01)

(56) References Cited

U.S. PATENT DOCUMENTS

| | | | |
|---|---|---|---|
| 3,973,355 | A | 8/1976 | McKenzie |
| 4,096,125 | A | 6/1978 | Smith |
| 5,762,230 | A | 6/1998 | Policappelli |
| 5,883,199 | A | 3/1999 | McCarthy |
| 5,928,741 | A | 7/1999 | Anderson |
| 5,948,020 | A | 9/1999 | Yoon et al. |
| 6,024,784 | A | 2/2000 | Buisman |
| 6,164,011 | A | 12/2000 | Gaudreault |
| 6,515,054 | B1 | 2/2003 | Matsushita |
| 8,641,960 | B1 | 2/2014 | Medeiros |
| 2002/0012705 | A1 | 1/2002 | Domb |
| 2003/0073804 | A1 | 4/2003 | Imamura |
| 2003/0183253 | A1 | 10/2003 | Cornelius |
| 2003/0216492 | A1 | 11/2003 | Bowden |
| 2003/0232929 | A1 | 12/2003 | Huang et al. |
| 2004/0018240 | A1 | 1/2004 | Ohmachi |
| 2004/0099979 | A1 | 5/2004 | Chen |
| 2005/0238618 | A1 | 10/2005 | Huang |
| 2006/0062989 | A1 | 3/2006 | Enomoto |
| 2006/0088595 | A1 | 4/2006 | Asakawa |
| 2006/0147491 | A1 | 7/2006 | Dewitt |
| 2006/0246108 | A1 | 11/2006 | Pacetti et al. |
| 2007/0148384 | A1 | 6/2007 | Bowden |
| 2007/0213424 | A1 | 9/2007 | Margam |
| 2008/0171482 | A1 | 7/2008 | Weber |
| 2008/0213590 | A1 | 9/2008 | Greiner |
| 2008/0305144 | A1 | 12/2008 | Brown |
| 2009/0019765 | A1 | 1/2009 | Kosinski |
| 2009/0025290 | A1 | 1/2009 | Trabka |
| 2009/0068463 | A1 | 3/2009 | Mochizuki |
| 2009/0081396 | A1 | 3/2009 | Hokari |
| 2010/0055473 | A1 | 3/2010 | Fenn |
| 2010/0120145 | A1 | 5/2010 | Brunner |
| 2010/0173000 | A1 | 7/2010 | Libin |
| 2010/0200587 | A1 | 8/2010 | Ito |
| 2010/0216909 | A1 | 8/2010 | Berg Gebert |
| 2010/0323212 | A1 | 12/2010 | Chang |
| 2011/0009522 | A1 | 1/2011 | Kasuga |
| 2011/0245922 | A1 | 10/2011 | Kasuga |
| 2011/0262683 | A1 | 10/2011 | Mochizuki |
| 2011/0311746 | A1 | 12/2011 | Ma |
| 2012/0015020 | A1 | 1/2012 | Pourdeyhimi |
| 2012/0015891 | A1 | 1/2012 | Marom |
| 2012/0016475 | A1 | 1/2012 | Parsons |
| 2012/0156135 | A1 | 6/2012 | Farokhzad |
| 2012/0270031 | A1 | 10/2012 | Guan |
| 2013/0165957 | A1 | 6/2013 | Ciardelli |

FOREIGN PATENT DOCUMENTS

| | | | |
|---|---|---|---|
| JP | 07097545 | A | 4/1995 |
| JP | H0998671 | A | 4/1997 |
| JP | 09205895 | A | 8/1997 |
| JP | H09205895 | A | 8/1997 |
| JP | 2000191930 | A | 7/2000 |
| JP | 2001145428 | A | 5/2001 |
| JP | 2002012258 | A | 1/2002 |
| JP | 2002153138 | A | 5/2002 |
| JP | 2002253064 | A | 9/2002 |
| JP | 2002338796 | A | 11/2002 |
| JP | 2003176448 | A | 6/2003 |
| JP | 2003238931 | A | 8/2003 |
| JP | 2003250350 | A | 9/2003 |
| JP | 2004044017 | A | 2/2004 |
| JP | 2005089537 | A | 4/2005 |
| WO | 2010039865 | A2 | 4/2010 |

OTHER PUBLICATIONS

Supplementary Partial European Search Report from a counterpart foreign application—EP 11 87 2227—5 pages, dated Apr. 7, 2015.
English translation of the notice of reasons for rejections received from the Japanese patent office in Japanese Patent application No. 2014-530376, dated May 7, 2015.
International Search Report of corresponding PCT application—PCT/IL2011/000739—, dated May 8, 2012, 3 pages.
Bognitski et al, Nanostructured Fibers via Electrospinning, Adv. Mater. 2001, 13, No. 1, Jan. 5 (3 pages).

* cited by examiner

BIO-DEGRADABLE COMPOSITIONS AND USE THEREOF

CROSS-REFERENCE TO RELATED APPLICATIONS

This application is a continuation of U.S. patent application Ser. No. 14/344,643, filed on Mar. 13, 2014, which is a National Phase of PCT Patent Application No. PCT/IL11/00739, filed on Sep. 18, 2011, all of which are incorporated herein by reference in their entirety.

FIELD OF THE INVENTION

The invention relates to biodegradable compositions and their use, especially as sealants or adhesives in agriculture.

BACKGROUND

A sealant is usually used to prevent the penetration of substances or pollutants (such as air, gas, dust, fire, smoke or liquid) from one location through a barrier into another. Typically, desirable properties of sealants include insolubility, corrosion resistance, and adhesion. Sealants are used in many industries including in agriculture and in home gardening, typically for preventing moisture from penetrating through barriers. For example, the inside of terra-cotta plant pots may include a layer of sealant to reduce water loss from the pot.

Plant pots are commonly used by nurseries and green houses to grow plants for commercial use. Plants are grown in pots until they are mature enough to be distributed to retail outlets or to consumers. Typically, molded plastic pots are used for growing plants. Consumers that purchase plants in pots usually transplant the plants into soil at their home, discarding the plastic pot. The pots then end up in landfills or garbage dumps, where they remain for a very long time because they are not biodegradable.

Alternatives to conventional plastic pots exist. Biodegradable pots made of paper (cellulose fibers), peat and other organic waste are known. These pots are designed to degrade relatively quickly when buried in soil. This allows consumers to simply bury the pot with the plant in it, rather than having to remove the plant from the pot before planting. However, the biodegradable pots must also be substantially resistant to saturation by liquids so that they do not begin to disintegrate prior to being buried in soil.

Some biodegradable pots include a thermoplastic polymer layer which faces an interior of the plant pot which is exposed to soil placed in the plant pot. However, methods of irrigation and the humid environment in many nurseries cause the external surfaces of pots to be exposed to moisture, so that a sealant on the interior of a plant pot does not prevent degradation of the pot while still on the shelf in the nursery.

Nurseries also use plug trays for plant transplants. In plug trays each transplant grows in an individual cell avoiding competition among plants and providing uniformity of the plants. Several other advantages of plugs (also called rooting plugs) over bare-root transplants include a smaller amount of water required for plugs over bare-root transplants, a mechanical multiple-row plug transplanter can be used for planting, there is minimal root damage during transplanting and plant survival is greater. The growing media in plug trays is typically a soilless mix generally made up of a combination of peat, vermiculite and horticultural perlite and sometimes fertilizer which is packaged in a thin degradable wrap. Sometimes adhesives are used for supporting and hardening the plugs.

Some commercial greenhouses use seepage irrigation (also known as sub-irrigation), which is a method of irrigation that allows the soil to be moistened from below the plants' root zone. Water is delivered from below, absorbed upwards, and the excess collected for recycling. Typically, a solution of water and nutrients floods a container or flows through a trough for a short period of time, 10-20 minutes, and is then pumped back into a holding tank for reuse. The bottom parts of plant pots and plugs irrigated this way are almost constantly submerged in water.

Known bio-degradable plant pots and plugs are not suited for use with seepage irrigation systems and many other irrigation systems used in green houses and nurseries since they are susceptible to disintegration while still in the nursery or green house due to exposure to the extreme moisture in green house and nursery environments.

SUMMARY OF THE INVENTION

Embodiments of the invention provide bio-degradable compositions that can be used as a sealant or adhesive for use in agriculture and home gardening and which overcome the drawbacks of known sealants. The compositions according to embodiments of the invention enable bio-degradation at different rates such that stability of articles coated by these compositions can be tailored to need.

Compositions according to embodiments of the invention comprise a bio-degradable polymer or co-polymer, and an organic non hydroxylic solvent. According to one embodiment the composition comprises at least two solvents, one of the solvents acting as a modifier to enhance desired properties (e.g., elasticity) of the composition.

In one aspect of the invention there is provided a bio-degradable composition comprising 0.2%-10% w/w bio-degradable polymer and an organic non hydroxylic solvent. According to one embodiment the composition comprises a plurality of organic non hydroxylic solvents. According to one embodiment one of the organic non hydroxylic solvents is an organic ester or a ketone.

According to some embodiments the organic non hydroxylic solvent has a boiling point of less than 80° C.

In one embodiment the bio-degradable polymer is poly lactic acid (PLA) and the organic non hydroxylic solvent is dichloromethane (DCM).

In one embodiment the composition comprises PLA, DCM and Ethyl Acetate (EtOAc). The composition may optionally include acetone.

In one embodiment the composition includes 0.2%-10% w/w PLA and up to 50% DCM and up to 50% EtOAc. Some embodiments include about 0.2% w/w bio-degradable polymer. Other embodiments include about 1% w/w bio-degradable polymer. Yet other embodiments include about 2% w/w bio-degradable polymer. Some other embodiments include about 6% w/w bio-degradable polymer and yet other embodiments include about 10% w/w bio-degradable polymer.

In one aspect of the invention there is described the use of the compositions described herein, in the preparation of a coating for bio-degradable articles.

In another aspect of the invention there is provided a method for preparing a rooting plug, the method comprising mixing a composition according to embodiments of the invention with plug mix. In one embodiment the composition comprises 1-2% w/w bio-degradable polymer.

The method may further include creating a hollow in the plug mix and mixing the composition with the plug mix at the hollow.

In yet another aspect of the invention there is provided a bio-degradable article (such as a plant pot or food-ware) which includes an article body and a coating of the article body. The coating may include 0.2%-10% w/w bio-degradable polymer and an organic non hydroxylic solvent. According to some embodiments the coating comprises a plurality of organic non hydroxylic solvents. In one embodiment one of the organic non hydroxylic solvents is an organic ester or a ketone. In some embodiments the organic non hydroxylic solvent has a boiling point of less than 80° C.

In some embodiments the bio-degradable polymer is PLA and the organic non hydroxylic solvent is DCM.

In some embodiments the coating comprises PLA, DCM and EtOAc. In some embodiments the coating comprises acetone The coating may include 1%-10% w/w PLA and up to 50% DCM and up to 50% EtOAc. In one embodiment the coating comprises about 1% w/w bio-degradable polymer.

In some embodiments the article comprises more than one type of coating. In some embodiments one type of coating comprises a higher percent of polymer than a second type of coating.

In other embodiments the article body may be partially coated.

In another aspect of the invention there is provided a bio-degradable plant pot comprising calcium carbonate. The pot may further include a cellulose containing material and optionally a starch and/or sulfate lignin and/or molasses.

The pot, according to one embodiment may include a coating, said coating comprising 0.2%-10% w/w bio-degradable polymer and an organic non hydroxylic solvent.

BRIEF DESCRIPTION OF THE FIGURES

The invention will now be described in relation to certain examples and embodiments with reference to the following illustrative figures so that it may be more fully understood. In the drawings.

DETAILED DESCRIPTION OF THE INVENTION

Embodiments of the invention provide bio-degradable compositions that can be used as a sealant or adhesive for use in agriculture and home gardening. According to other embodiments the compositions may be used in other fields of industry.

Compositions according to embodiments of the invention comprise a bio-degradable polymer or co-polymer, and an organic non hydroxylic solvent. According to one embodiment the composition comprises at least two solvents, one of the solvents possibly acting as a modifier.

Examples of bio-degradable polymers or co-polymers that may be used in compositions according to embodiments of the invention include poly lactic acid (PLA) or poly lactic-co-glycolic acid (PLGA) and typically naturally occurring polyesters including polyhydroxyalkanoates, such as poly hydroxyl butyrate (PHB). Other suitable bio-degradable polymers may be used.

Examples of solvents that may be used in compositions according to embodiments of the invention include dichloromethane (DCM), dichloroethane, tetrachloroethylene, tetrahydrochloride, dimethylformamide (DMF), acetonitrile, dimethyl sulfoxide (DMSO), organic esters such as: ethyl acetate (EtOAc), butyl acetate and ethyl propionyl, and ketons such as acetone and cyclohexanone. Other suitable solvents may be used.

According to one embodiment compositions are prepared by mixing, in room temperature (about 25° C.), a polymer (possibly in the form of a resin) into a solvent or mixture of solvents until the polymer is dissolved. The mixture may then be heated to remove excess solvent. In one embodiment the composition is heated only up to about 80° C.

According to one embodiment compositions may include a mixture of solvents, one solvent having a higher boiling point than the other. For example, DCM and EtOAc may be both used as solvents in a composition, the DCM evaporating more rapidly than the EtOAc due to its lower boiling point. The slower evaporating EtOAc may then enable certain properties of the composition to be expressed. For example, a higher percent of EtOAc relative to DCM may be used in a composition to obtain a more elastic coating.

Compositions resulting from the mixtures described above are fluids which become film-like upon drying. Compositions according to embodiments of the invention can be used for coating articles (e.g., by immersion or by spraying) typically biodegradable articles, such as bio-degradable plant pots, bio-degradable food-ware (plates, bowels, cups and other utensils) and other suitable articles.

Bio-degradable articles, often single-use articles, are usually designed to rapidly disintegrate once buried in soil. However, when coated, the rate of degradation of the coating typically determines the degradation of the whole article.

According to one embodiment compositions comprise 0.2%-10% w/w polymer in solvent. Viscosity and durability of the composition are directly proportional to the percent of polymer in the composition.

Compositions and coatings according to embodiments of the invention can be designed to disintegrate at different rates such that stability of articles coated according to embodiments of the invention, can be tailored to need.

For longer durability of the coating a composition having a higher percent of polymer may be used. According to some embodiments, several coat layers may be used for overall longer durability of the coating.

For example, disposable food ware, such as a plate, is expected to be kept in relatively dry conditions until it is used. During its use the plate is expected to be exposed to liquids and after its use (typically, a matter of hours) the plate is discarded. In this case, a coating designed to disintegrate within hours or days of exposure to moisture may be appropriate.

In the case of disposable plant pots, the pots are expected to be kept in a moist environment for a period of several weeks up to several months prior to being discarded or being planted in soil (e.g., in the nursery or in a consumer's house prior to the plant being transferred to soil). Once in soil (either in the garbage dump or, if relating to a plantable pot, in soil after being planted) the pot may disintegrate more rapidly. In fact, rapid disintegration of a plantable pot is advantageous in facilitating plant growth due to release of the plant's roots from the enclosure of the plant pot walls. Thus, according to one embodiment, coating of plant pots is designed for several weeks' up to several months' durability on the shelf in a nursery but quicker disintegration in soil.

Compositions according to embodiments of the invention enable to produce a bio-degradable plant pot that can withstand extreme moisture conditions, such as the conditions prevailing in nurseries, for example nurseries employing seepage irrigation.

Plant pots coated according to embodiments of the invention may be differentially coated. For example, a bottom part (floor) of a pot may be coated with a more durable composition (e.g., higher percentage of polymer) than the surrounding walls of the pot or the interior of a pot may be coated with a more durable composition relative to the exterior of the pot.

In another embodiment rooting plugs may include growth media (also referred to as plug mix) mixed with a composition according to embodiments of the invention. Compositions according to embodiments of the invention may be used as an adhesive to produce a firmer (and thus more easily handled) plug than currently used plugs. Plugs can be designed to be durable for a longer period and/or the solidity or firmness of each plug may be designed to need based upon the specific composition used.

Figure 1:
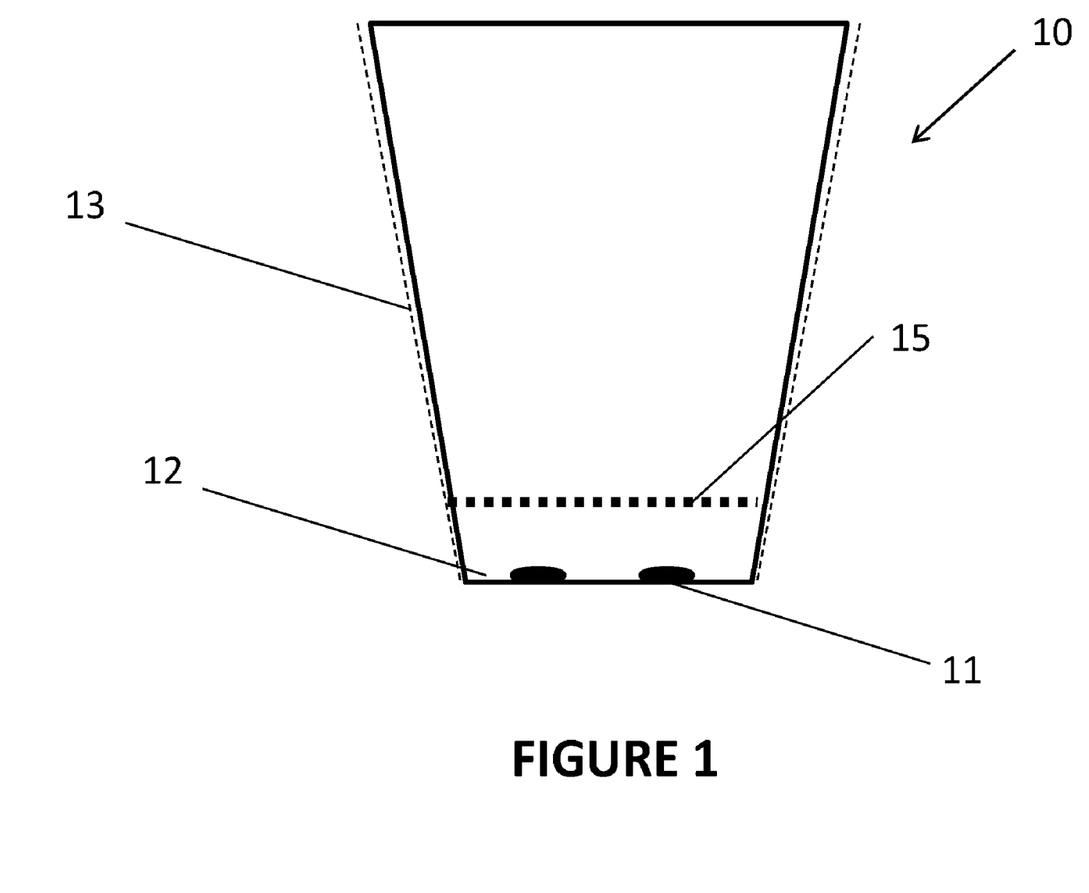
FIG. 1 is a schematic illustration of a plant pot coated with a sealant according to one embodiment of the invention.

One embodiment of the invention is schematically illustrated in FIG. 1 in which a bio-degradable plant pot (10) is coated with a sealant according to embodiments of the invention to prevent degradation of the pot while in use. According to one embodiment degradation of the sealant starts at a pre-designed time after coating of the pot, eventually enabling environment friendly degradation of the whole pot.

A bio-degradable pot may be made of agriculture residues such as bamboo pulp or husks, composted manure, saw dust, different starches and other organic, typically renewable, matter. According to one embodiment a plant pot (or other article) may be made of a mixture of calcium carbonate (typically used in industry to entrap impurities, such as in the sugar production industry) and sawdust or other cellulose containing material. A small amount of starch, sulfate lignin or molasses is added to the calcium carbonate-cellulose mixture to act as an adhesive. Other suitable adhesives may be added. Water is then added to the mixture to obtain a dough-like composition that may be shaped into pots or other articles. The articles are then dried (possibly while heating). According to another embodiment the calcium carbonate—cellulose-adhesive mixture (or other suitable mixtures) is shaped into a pot by press forming or by thermoforming. Other methods may be used for preparing pot.

According to one embodiment bio-degradable pots may be made of mixture comprising 40% calcium carbonate, 40% sawdust and 20% flour. Other percentages of calcium carbonate and cellulose containing materials and starch containing materials may be used.

A typical plant pot (10) includes drainage holes (11) in its bottom part (12). According to one embodiment a plant pot (10) is coated by spraying a composition according to embodiments of the invention on it to completely cover the pot with a coating of composition or to partially cover the pot. Any other suitable methods of coating may be used. The pot is then dried in the open air until the formation of a film-like coating (13) over all the surfaces of the pot. The pot may be dried under other conditions, such as by being heated, typically, not more than 80° C. The coating (13) serves as a sealant to prevent early degradation of the organic matter composing the pot.

According to one embodiment a plant pot (10) or other article may include a weakened zone (15) for easy breaking/tearing of the pot (or other article). The weakened zone (15) may include a thinning of the pot wall so that the pot may be easily broken or torn along the weakened zone (15). Other techniques for weakening an area of the pot may be used. According to one embodiment the weakened zone (15) may be located on the pot (10) such that the bottom part (12) of the pot may be broken off, for example, prior to planting the pot in soil, to enable free growth of roots through the bottom area of the pot into the ground. According to other embodiments weakened zones may be located along side the pot walls or in any other desired location.

Figure 2:
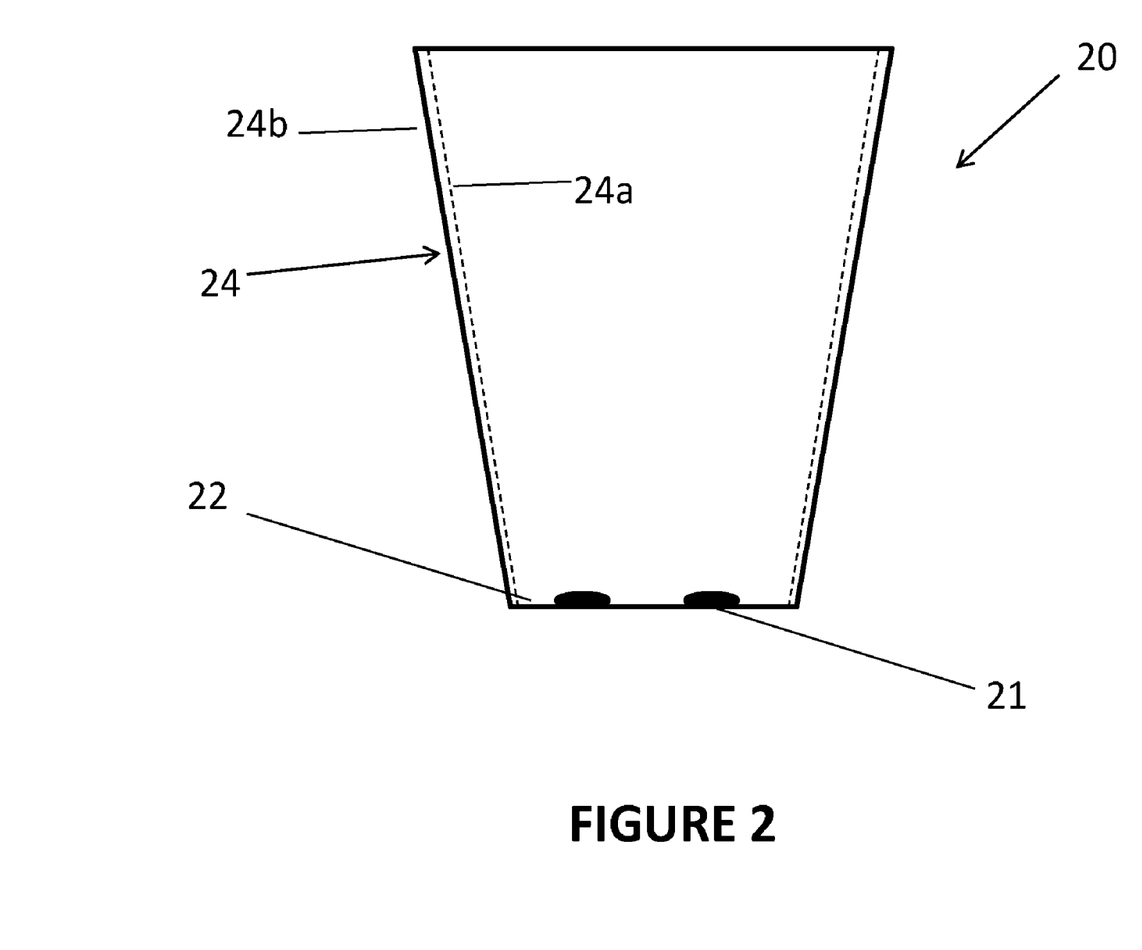
FIG. 2 is a schematic illustration of plant pot differentially coated with a sealant according to an embodiment of the invention.

Compositions according to embodiments of the invention enable to coat different areas of a pot in different types of coatings. An example of this differential coating is schematically illustrated in FIG. 2.

According to one embodiment the bottom part (22) of a plant pot (20) is coated by a more durable composition than the surrounding walls (24) of the pot. For example, the bottom part (22) of the pot (20) may be submerged in a first liquid composition comprising a high percent of polymer. The liquid composition will reach the inner part of the pot through the drainage holes (21) and will thus flow over the inner bottom part (22) of the pot. Once the first composition coating the bottom part (22) has dried the surrounding walls (24) of the pot may be coated with a second composition, by spraying or any other suitable method of applying a liquid composition. The second composition typically comprises a lower percentage of polymer than the first composition.

In another embodiment, the whole pot (20) may be coated by a first composition. Upon drying or upon partial drying, additional coats of the first composition (or of another composition) may be applied on the bottom part (22) to achieve a more durable coating of the bottom part (22) than the coating of the rest of the pot.

Having a particularly durable coating on the bottom part of a pot may be useful especially in cases where seepage irrigation is used.

In other embodiments, the inner part (24a) of the surrounding walls (24) of a pot (and/or the inner part of the bottom part (22)) may be sprayed or otherwise coated by a more durable composition than the outer part (24b) of the surrounding walls (24). This type of differential coating may be especially useful in cases where a plant is watered by a drip or other irrigation system from the top of the pot which wets the soil in the pot such that the inner parts of the pot are more exposed to moisture than the outer part of the pot.

According to other embodiments some areas of the pot (20) may be coated while other areas are left uncoated. According to one embodiment a weakened zone (such as weakened zone 15 in FIG. 1) may be coated by a different, less durable, composition than other parts of the pot (20). According to other embodiments a zone may be weakened by being left uncoated or by being coated by a relatively less durable composition than other areas of the pot (20).

Figure 3:
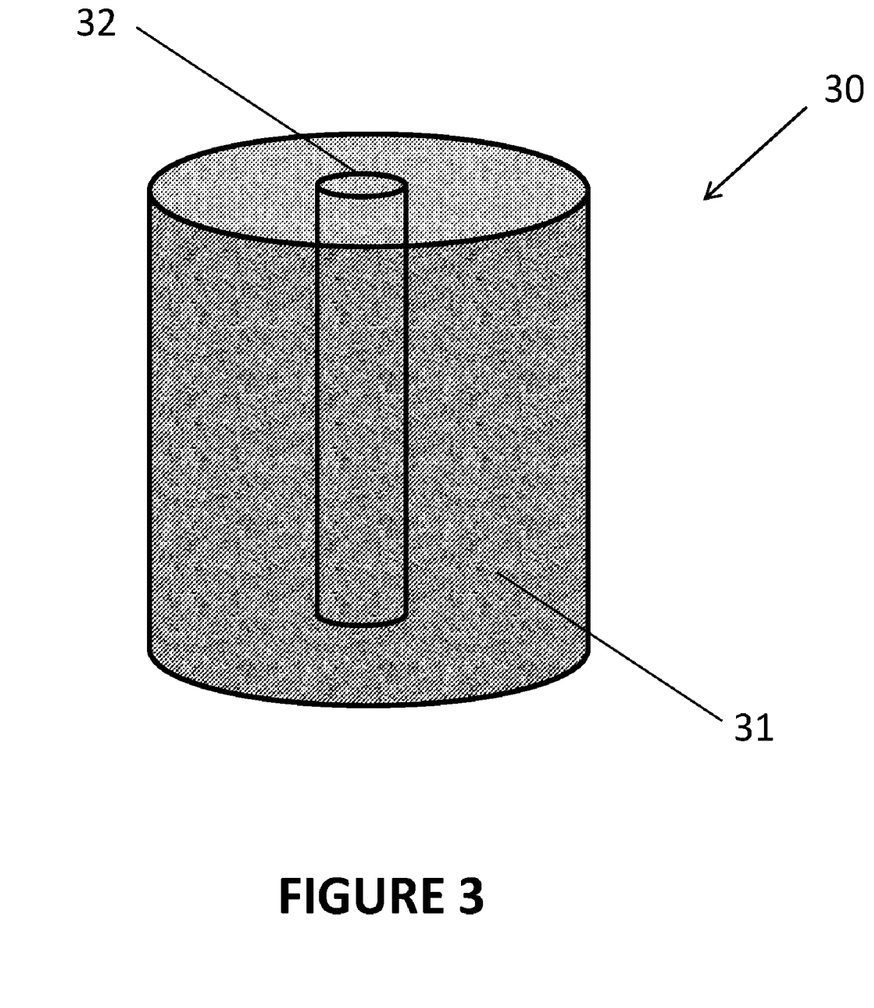
FIG. 3 is a schematic illustration of a plug including an adhesive according to embodiments of the invention.

A composition according to another embodiment of the invention may be used as an adhesive to be mixed in the media of a rooting plug. As schematically illustrated in FIG. 3, a plug (30) which includes a soilless mix (31) or any other suitable mix, includes a hollow (32) for accepting a seed, seedling, shoot, grafts or other suitable types of plants.

Compositions according to embodiments of the invention may be blended into the plug mix (31). Upon drying, the composition will confer firmness to the plug which is advantageous for handling by a mechanical transplanter.

In one embodiment, liquid compositions may be sprayed or otherwise applied to the hollow (32), to confer rigidity to the structure of the hollow (32).

According to some embodiments plug trays, which are usually made of plastic, may be made of bio-degradable materials coated by compositions according to embodiments of the invention.

Figure 4:
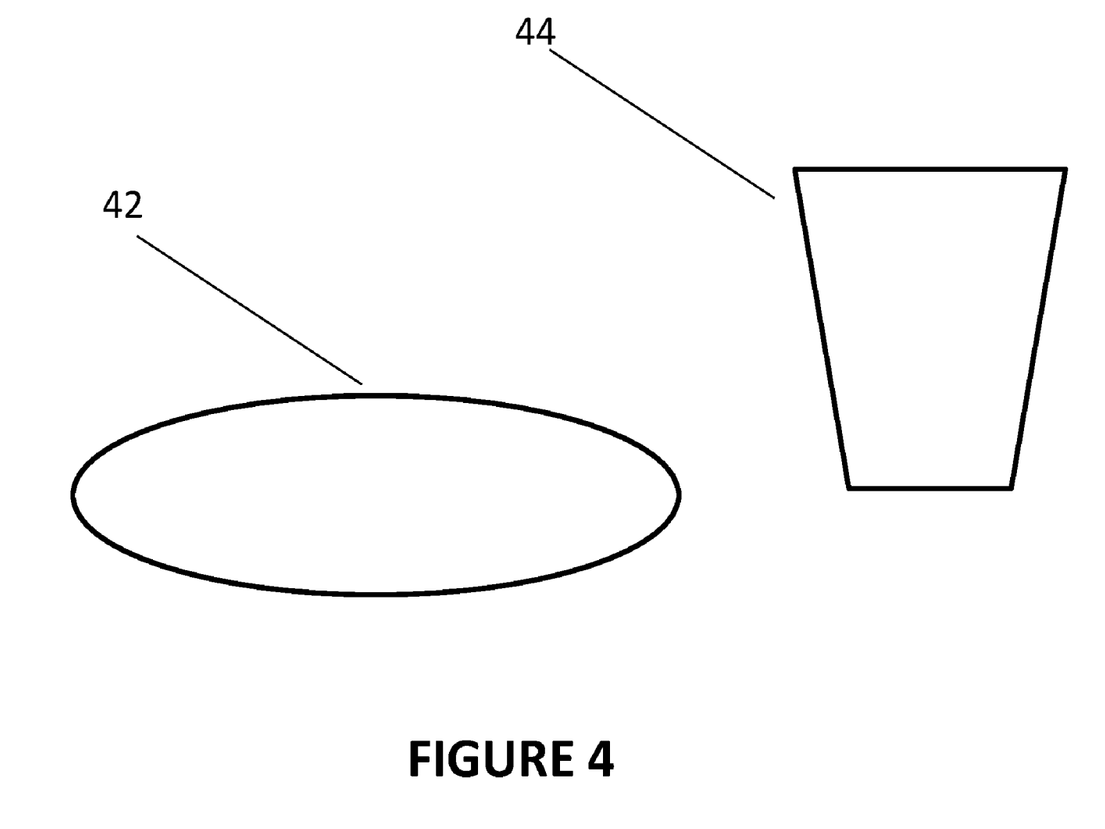
FIG. 4 is a schematic illustration of food ware coated with a sealant according to an embodiment of the invention.

Compositions according to embodiments of the invention may be used in fields other than agriculture. For example, the compositions may be used for coating bio-degradable disposables such as food ware or table ware. One example of food-ware according to an embodiment of the invention is illustrated in FIG. 4, which shows a plate (42) and cup (44) which are coated by compositions according to embodiments of the invention.

Bio-degradable plates or cups may be made of organic materials such as sugar cane and/or other starches. Durability of plates, cups and other bio-degradable table-ware may be strengthened by being coated with compositions according to embodiments of the invention, thereby enhancing their shelf-life without diminishing their friendliness to the environment.

Embodiments of the invention will be exemplified in the following non limiting examples.

EXAMPLES

Compositions I-VIII were prepared by mixing PLA resin (Ingeo™ by NatureWorks, USA) into a mixture of solvents at room temperature (about 25° C.) until full dissolution of the resin. Resulting compositions were fluid, in different levels of viscosity. Viscosity of each composition was directly proportional to the percent of polymer in the composition.

Example 1—Rooting Plugs

Composition I:
1 gr PLA
40 ml EtOAc
10 ml DCM

Rooting plugs of 2×3 cm were prepared using an Ellegaard™ system. A finger sized hollow was made in the center of each plug. Each hollow was sprayed with 0.5 cc of composition I using a syringe. Control plugs were left untreated. The plugs were dried in RT over night and a *Gypsophila* (Baby's Breath) shoot was placed in each of the plugs' hollows. Plugs were irrigated for one month with irrigation from on top.

Plant Development—Plant development was better in treated plugs. Plants grown in treated plugs had more root mass than the plants grown in control plugs, possibly due to better water retention in the treated plugs.

Composition stability—Treated plugs were stable after one month in trays. Degradation of treated plugs was observed upon planting in soil (within days of planting).
Composition II
0.5 gr PLA
35 ml EtOAc
10 ml DCM
5 ml acetone Rooting plugs of 2×3 cm were prepared using an Ellegaard™ system. A finger sized hollow was made in the center of each plug. Each hollow was sprayed with 0.5 cc of composition II using a syringe. Control plugs were left untreated. The plugs were dried over night. A tomato plant was placed in each plug's hollow. Plugs were irrigated for two weeks with irrigation from on top.

Plant Development—Plant development was better in treated plugs as described above.

Composition stability—Treated plugs were stable for two weeks in trays. Degradation started after two weeks.

Similar results are expected with all types of vegetables and other short term plants.

Example 2—Bio-Degradable Plant Pots

| Composition III: | Composition IV: | Composition V: |
|---|---|---|
| 4 gr PLA | 4 gr PLA | 4 gr PLA |
| 160 ml EtOAc | 180 ml EtOAc | 160 ml EtOAc |
| 40 ml DCM | 20 ml DCM | 20 ml DCM |
|  |  | 20 ml acetone |

Plant pots (7 cm diameter, made of packed saw dust (50%) and starch (50%)) were immersed in compositions III-V until totally coated. The pots were let to air dry at RT for 30-45 minutes. Coated pots were filled with soil (mostly peat). A shoot of mint plant was planted in the soil filled pots. Pots were irrigated once a day such that the soil was always moist, for three months. The pots were buried in soil after three months.

In addition to using the compositions to coat the pots, compositions were also left to dry in the beaker to examine their different characteristics when dried films.

Plant Development—no negative effect was demonstrated on growth of the mint plants.

Composition stability—composition IV dried to form a more elastic film than composition III. Composition V could be diluted in water as opposed to compositions III and IV which could not be easily dissolved in water.

Coated plant pots were stable for three months. After being buried in soil for two days the framework of the pots began to deteriorate. After three days of being buried in soil the pot framework was completely disintegrated.

| Composition VI: | Composition VII: |
|---|---|
| 12 gr PLA | 20 gr PLA |
| 100 ml EtOAc | 100 ml EtOAc |
| 100 ml DCM | 100 ml DCM |

Plant pots (7 cm diameter, made of packed saw dust (50%) and starch (50%)) were immersed in compositions VI-VII until totally coated. The pots were let to air dry at RT for an hour. Some of the pots were coated twice. Coated pots were filled with soil (mostly peat). A shoot of mint plant was planted in the soil filled pots. Pots were irrigated once a day such that the soil was always moist, for over three months. The pots were buried in soil after more than three months.

Plant Development—no negative effect was demonstrated on growth of the mint plants.

Composition stability—Plant pots coated with composition VI were stable for three months. Plant pots coated with composition VII were stable for over three months. After being buried in soil for two days the framework of all the pots began to deteriorate. After three days of being buried in soil the pot framework was completely disintegrated. The pots having two layers of coating disintegrated only after being buried for 5-6 days.

Example 3—Bio-Degradable Plates

Composition VIII:
0.1 gr PLA
45 ml EtOAc
5 ml DCM

Paper plates coated with composition VIII are expected to have a long shelf life and to disintegrate a few days after being continuously exposed to moisture (e.g., the environment in a garbage dump).

The invention claimed is:

1. A method for preparing a rooting plug, the method comprising mixing a composition comprising (i) 0.2%-10% w/w bio-degradable polymer and (ii) an organic non-hydroxylic solvent with plug mix, wherein the organic non-hydroxylic solvent comprises dichloromethane (DCM), thereby preparing a rooting plug.

2. The method of claim 1, comprising creating a hollow in the plug mix and mixing the composition with the plug mix at the hollow.

3. The method of claim 1, wherein the composition comprises a plurality of organic non-hydroxylic solvents.

4. The method of claim 3, wherein the composition comprises poly lactic (PLA), DCM and ethyl acetate (EtOAc).

5. The method of claim 4, further comprising acetone.

6. The method of claim 4, comprising 0.2%-10% w/w PLA, up to 50% DCM and up to 50% EtOAc.

7. The method of claim 3, wherein one of the organic non-hydroxylic solvents is an organic ester or a ketone.

8. The method of claim 1, wherein the organic non-hydroxylic solvent has a boiling point of less than 80° C.

9. The method of claim 1, wherein the bio-degradable polymer is poly lactic (PLA).

10. The method of claim 1, wherein the organic non-hydroxylic solvent is DCM.

11. The method of claim 1, comprising 0.2%-1% w/w bio-degradable polymer.

12. The method of claim 1, wherein the composition comprises 1-2% w/w bio-degradable polymer.

13. The method of claim 1, comprising about 6% w/w bio-degradable polymer.

14. The method of claim 1, comprising about 10% w/w bio-degradable polymer.

15. A bio-degradable article prepared by the method of claim 1.

* * * * *